Dec. 5, 1950 R. P. LAPSLEY 2,532,504
METHOD AND APPARATUS FOR INSTALLING
ELECTRIC CABLE SYSTEMS
Filed Oct. 7, 1948 4 Sheets-Sheet 4

INVENTOR.
RHEA P. LAPSLEY
BY James G. Bethell
ATTORNEY

Patented Dec. 5, 1950

2,532,504

UNITED STATES PATENT OFFICE 2,532,504

METHOD AND APPARATUS FOR INSTALLING ELECTRIC CABLE SYSTEMS

Rhea P. Lapsley, Rutherford, N. J., assignor to The Okonite Company, Passaic, N. J., a corporation of New Jersey Application October 7, 1948, Serial No. 53,229

16 Claims. (Cl. 175—376)

My invention relates to an improved method of and apparatus for installing electric power cables into steel pipe, metallic conduit, fibre duct, cement asbestos duct or other type of raceway, either metallic or non-metallic, and magnetic or non-magnetic.

My invention is particularly adaptable to the installation of a plurality of single conductor insulated electric power cables into steel pipe as is used for high pressure so-called "pipe type" cable systems, and for clarity this type of installation will be discussed first, and other applications later.

In installing pipe type cable systems in accordance with conventional practice, a pulling wire rope is threaded through the pipe line, one end of this rope being attached to a suitable winch, and the other end to a pulling eye on the end of each conductor. As the winch withdraws the pulling rope from the pipe line the conductors are drawn in. Under these conditions the conductors assume a random position in the pipe, which may vary from point to point along the length of the pipe line, inasmuch as the relative position of the conductors is uncontrolled. This random position of conductors is known in the industry as a "random lay" of the conductors.

It is an object of my invention to depart from this practice in that throughout the drawing in of the conductors, I control the position of the conductors relative to each other thereby controlling the angular position of the conductors with respect to the raceway cross section instead of allowing the conductors to assume a random lay.

In an alternating current electrical cable circuit the geometric arrangement of two or more single conductor cables installed in a magnetic steel pipe line has an effect upon the electrical properties of the circuit, and when the conductors are installed in a magnetic steel pipe line the effect of geometric arrangement is relatively large. It is desirable that the insulated conductors be in symmetrical configuration with respect to each other at all points throughout their length, be as close together as practicable, and have equal and minimum proximity to the pipe wall, if the pipe is of magnetic material. For instance, in a three phase circuit composed of three single conductor cables installed in steel pipe, the most desirable electrical characteristics are obtained when the conductors are twisted or spiralled together throughout their length. With conductors twisted or spiralled together, the spacing is triangular and conductors are symmetrical with respect to each other, the outer surfaces of the cables are in contact so the cables are as close together as practicable, and the conductors have equal and minimum proximity to the pipe wall, as the average distance from the bottom interior surface of the pipe wall to the conductors is increased.

The conductors when twisted or spiralled together throughout their length are individually in the shape of a long helix and can therefore contract or expand radially, without producing excessive tension or thrust on joints in the conductor when the conductor length changes due to temperature differences. Furthermore, when the conductors are twisted together, the heating of each conductor is more nearly uniform, as heat conduction along the conductors between convolutions tends to equalize temperature along the conductor.

In the accompanying drawings wherein I have illustrated my invention as applied to "pipe type" cable systems;

Figs. 1 and 2 are elevational views of one embodiment of the invention; Fig. 2 being on a slightly larger scale than Fig. 1;

Fig. 6 is an enlarged elevational view of a device to be attached to the pulling line and to the conductors for guiding, spiralling, or twisting the conductors together as they are being drawn in;

Referring to the drawings in detail and first of all to the embodiment illustrated in Figs. 1 to 7 inclusive.

2 designates a pipe line, and 4, 6 and 8 the three separately insulated conductors which are to be drawn thereinto. As above briefly pointed out, one object of my invention is to spiral or twist the conductors together as they are being drawn in, thereby positively controlling the lay of the conductors in the pipe line and avoiding the random lay which is characteristic of this type of cable when installed by conventional methods.

Figure 1:
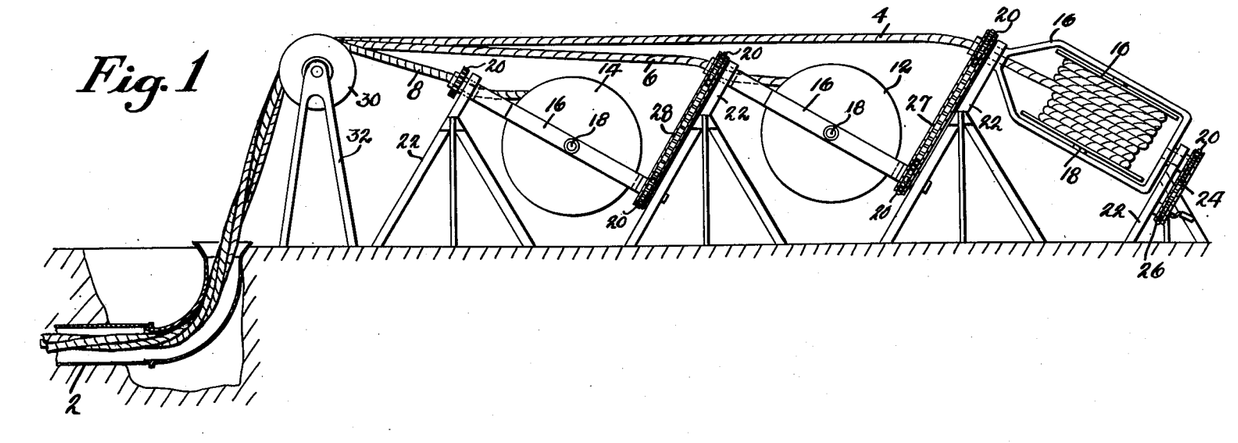
Figure 2:
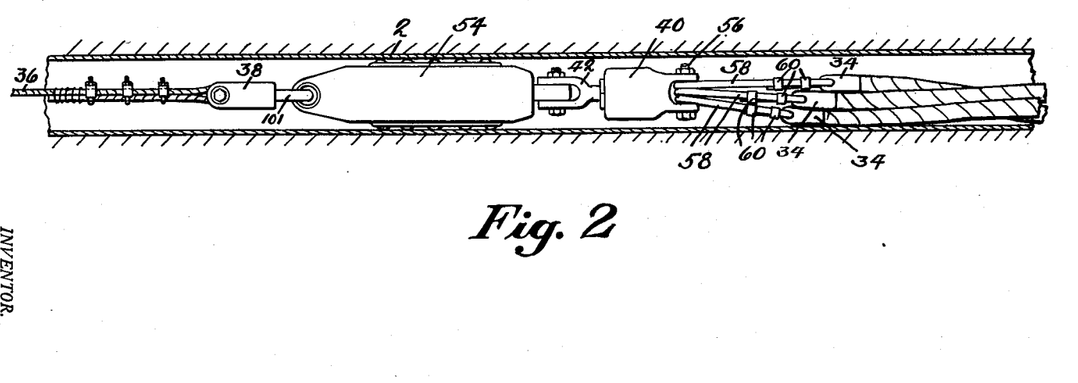

The conductors are shipped to the installation site on separate reels and may then be set up as illustrated more or less diagrammatically in Fig. 1. As illustrated in this figure of the drawing, the reels for these conductors are designated 10, 12 and 14, respectively. In mounting the reels, each reel is equipped with what may be termed a yoke 16. The sides of each yoke extend across each end of the reel and are brought together to the rear and to the front of each reel. A shaft 18 passes through the two side frames of each reel yoke and through the reel to provide for rotation of each reel on its own axis relatively to its yoke. Where the side frames come together at the front and rear of the reels, I provide a sprocket 20. The two ends of each reel yoke are mounted in stands 22 of such a height as to permit the yokes and reels to be rotated in the stands. To provide for this rotation, the sprocket 20 to the rear of reel 10 is belted by sprocket chain 24 to a sprocket 26 mounted in a suitable stand. Then the forward end of the yoke for reel 10 is belted by sprocket chain 27 to the rear end of the yoke for reel 12, while the forward end of the yoke for reel 12 is belted by sprocket chain 28 to the rear end of the yoke for reel 14. It will be apparent that this construction provides for simultaneous rotation of the three reels in their respective mounts simultaneously and in the same direction by simply rotating the sprocket 26. This has been shown as hand driven but may be motor driven if desired. Belts and pulleys may be substituted for the construction shown but I prefer the sprocket wheel and chain arrangement as this eliminates all slippage. On the other hand, gear trains may be employed, or for that matter, the reels may not be connected together at all but may simply be rotated in their respective mounts manually.

In addition to the construction so far described, the forward end of each reel yoke is preferably tubular or otherwise shaped or provided with a guide for each conductor as it is drawn off its reel.

Between this reel set-up and the pipe line 2, I provide a grooved idler pulley 30 on suitable stand 32, the conductors as they pass into the pipe line passing over this pulley.

The purpose for the reel set-up just described will be brought out hereinafter but I should like to note at this point that the construction described merely is illustrative and not definitive.

The end of each conductor is provided with a pulling eye 34 which is rigidly secured to the conductor.

The pulling rope which is to be attached to the conductors and run over a winch (not shown), by which the conductors are drawn into the pipe line 2, has been designated 36. This is a wire rope and its trailing end is securely attached to a swivel 38 of any suitable construction.

Figure 3:
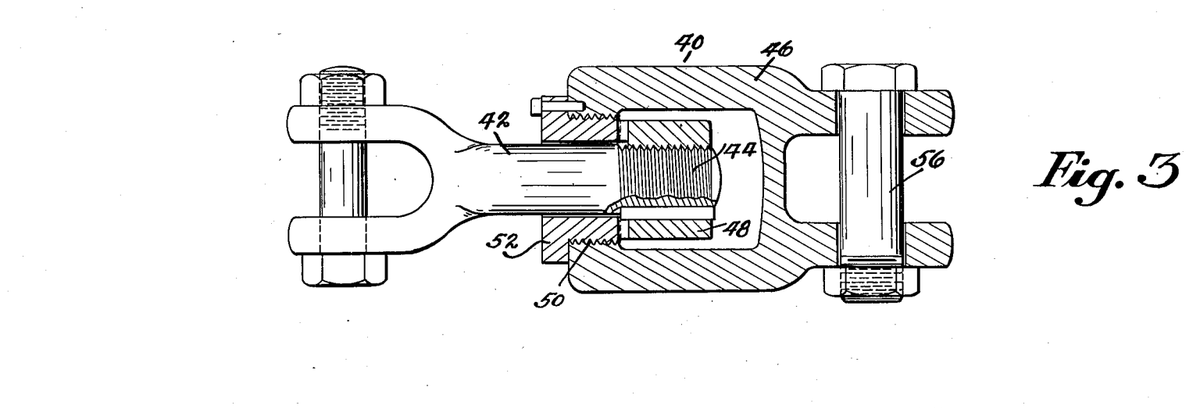
Fig. 3 is a part sectional elevational view of a torque release device employed in the practice of the invention.
Figure 4:
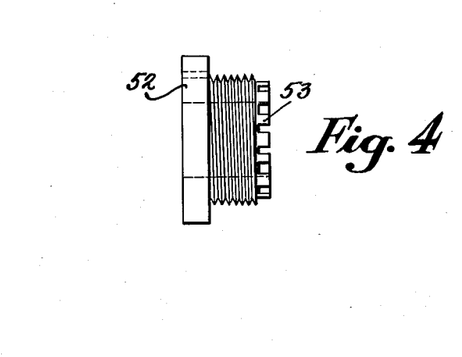
Figs. 4 and 5 are elevational views of parts of the torque release device of Fig. 3.
Figure 5:
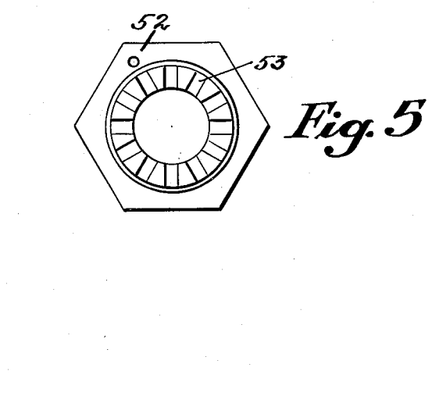

Attached to the pulling eyes 34 of the cable conductors is what I term a torque release device 40. The construction of this device is best illustrated in Figs. 3, 4 and 5 of the drawings. This device comprises a male member 42, the inner end of which is threaded as shown at 44 and projects loosely into female member 46.

Screwed upon the threaded end of the male member 42 and keyed thereto is a nut 48 which is a loose fit in the female member.

The female member at its outer end is screw-threaded internally as shown at 50, and threaded thereinto is bushing 52. The male member 42 extends through this bushing. As will be seen from Fig. 3, when this torque release device is assembled, the inner end of the bushing 52 and outer end of the nut 48 abut each other. The abutting ends of the bushing and nut are provided with complementary formations, illustrated as radial teeth 53, so that when tension is applied to the male and female members in opposed directions, the toothed faces of the bushing 52 and nut 48 will be brought into contact with each other so as to lock them and prevent relative rotation of male member 42 and female member 46. Inasmuch as the outside diameter of the nut 48 is less than the interior diameter of the female member, and inasmuch as the outside diameter of the male member 42 is less than the interior diameter of the bushing 52, it will be apparent that with no tension on the torque release device the nut 48 and bushing 52 can move apart so that the male and female members of this device may then be rotated relatively.

The outer end of the male member 42 of the torque release device is enlarged and bifurcated for the reception of one end of the guiding, spiralling or twisting device illustrated in Figs. 6 and 7 and designated 54, which, as will be explained presently is interposed between the torque release device 40 and the swivel 38.

The outer end of the female member 46 of the torque release device is bifurcated and equipped with bolt 56. To attach the pulling eyes 34 of the conductors to the female member of the torque release device, so that the leading ends of the conductors are in effect tied together, I employ short lengths 58 of wire rope, which are threaded through the pulling eyes and are passed about the bolt 56. The ends of these short lengths are secured in place by keeper clips 60.

Figure 6:
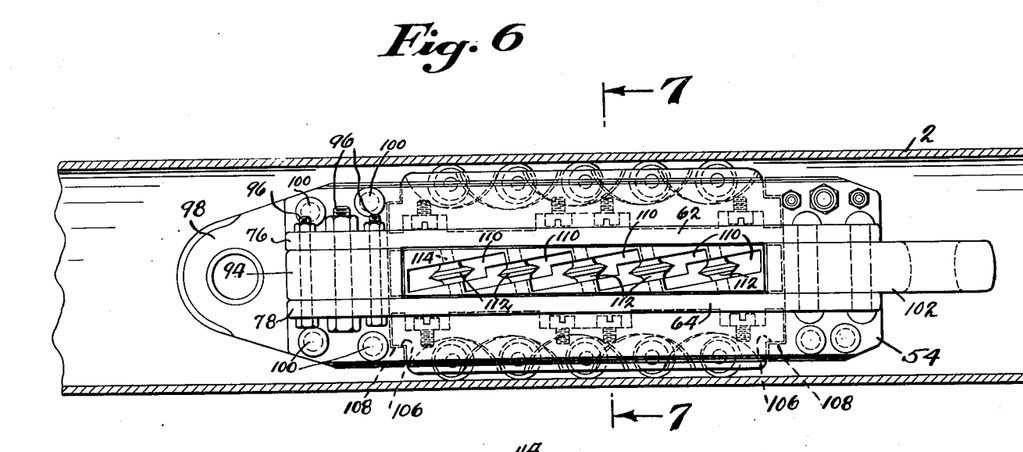
Figure 7:
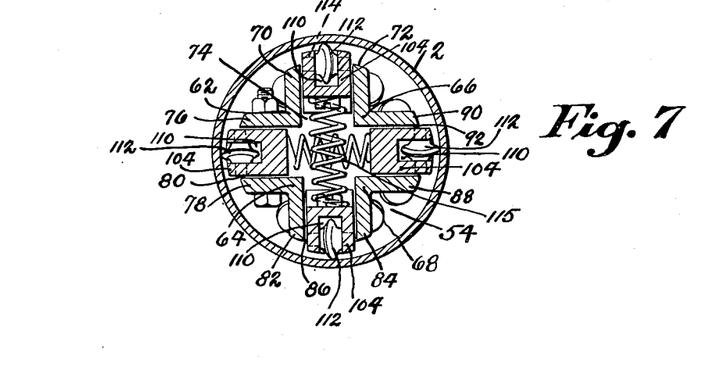
Fig. 7 is a sectional view approximately on the line 7—7 of Fig. 6.

The construction of the guiding, spiralling or twisting device 54 which is interposed between the torque release device 40 and the swivel 38, and attached to both, is best illustrated in Figs. 6 and 7.

From these illustrations it will be seen that the guiding, spiralling or twisting device comprises four angle irons 62, 64, 66, 68, extending parallel to each other and when the device is in use, extending lengthwise of the pipe line 2. These angle irons are so disposed relatively to each other, as will be seen from Fig. 7, as to provide roughly a circular cross-section. The angle irons are spaced from each other, the legs 70 and 72 of angle irons 62 and 66 facing each other and providing a groove 74 between them; the legs 76 and 78 of angle irons 62 and 64 facing each other and providing a groove 80 between them; the legs 82 and 84 of angle irons 64 and 68 facing each other and providing a groove 86 between them; the legs 88 and 90 of angle irons 68 and 66 facing each other and providing groove 92 between them.

The grooves 74, 80, 86 and 92 extend lengthwise of the device and are spaced 90° apart.

At one end of the device, the angle irons 62 and 64 are held rigidly in spaced relation by a short spacer 94, the same end of the angle irons 66 and 68 being held rigidly in spaced relation by a similar short spacer.

Bolts 96 pass through the angle iron legs 76 and 70, the spacers 94 and the angle iron legs 78 and 72.

A spacer 98 projects between the angle iron legs 70 and 72 and 82 and 84 and is riveted to these legs by rivets 100. The member 98, as will be seen from Fig. 6, projects beyond the ends of the angle irons for a substantial distance so that it may be bolted to the tail 101 of the swivel 38.

The guiding, twisting or spiralling device 54 at its opposite end is provided with similar spacers, the spacer 102 which corresponds to spacer 98, and the two spacers corresponding to spacers 94 being offset 90° with respect to those at the other end of the device.

The spacer 102 is extended a substantial distance beyond the end of the device 54 for attachment to the male member 42 of the torque release device.

Inserted in each of the grooves 74, 80, 86 and 92 of the device 54 provided by spacing the angle irons as above described is a block 104. Each end of each block is shouldered as shown at 106 and the inner end of each of the spacer members is undercut as shown at 108 for cooperation with these shoulders, so that the outward movement of the blocks 104 is limited and so that when the device is assembled, removal of the blocks is prevented.

Each block is provided in its outer face with a plurality of grooves 110 extending at an angle to the longitudinal axis of the device 54 and of the blocks as clearly illustrated in Fig. 6. These grooves are of substantial depth. Mounted in each groove is a cutter or friction wheel 112. The shaft 114 for each wheel 112 is set at an angle to the longitudinal axis of its carrying block. I have shown five wheels in each block but this number may be varied as desired as will be understood.

As will be seen from Fig. 7, the periphery of each cutter or friction wheel 112 projects beyond the outer face of its carrying block 104 and the blocks themselves project beyond the extremities of the legs of the angle irons. The blocks and wheels are urged outwardly by springs 115, it being understood, of course, that hydraulic, pneumatic or other well known means may be employed for this purpose when desired. The device is so arranged so far as its outside dimensions are concerned, that the wheels 112 will engage the inner face of the wall of the pipe line 2 with the necessary pressure when the device is in use as will be explained later, and so that the dimensions over the angle irons will be small enough for the device to pass minor irregularities in the pipe.

So far as the guiding, twisting or spiralling device 54 just described is concerned, it will be appreciated that if it be inserted into a pipe line of such inside dimensions that the springs 115 will cause the wheels 112 to bite into the pipe line or be held against the pipe line under the necessary pressure and tension is applied to the device in a direction to advance the same along the pipe, the device 54 will be caused to rotate due to the diagonal or angular setting of the wheels 112. The distance traveled by the device 54 along the pipe for each complete revolution of the device will obviously depend upon the angle at which the wheels are set, and this distance and the direction of rotation can be varied at will by employing blocks carrying wheels set at the proper angle to give desired direction of rotation and distance.

In operation, the reels of conductors are set up at the entry end of the pipe line 2, and the pulling rope 36 threaded through the pipe line and attached to the swivel 38 at the trailing end of the pulling rope. The swivel is attached to the leading end of the guiding, twisting or spiralling device 54. The cable conductors are drawn off their respective reels threaded through the guides on their respective yokes and led over the idler pulley 30 and their pulling eyes 34 attached to the rear end of the torque release device 40. The winch (not shown) to which the leading end of the pulling rope is attached may now be started to draw the device 54 through and the conductors into the pipe line. As above pointed out, the wheels 112 either cut into the pipe line or are pressed against the pipe line with such pressure that the device 54 as it is pulled along the pipe will be rotated due to the angular setting of the cutter or friction wheels 112. The distance traveled for each revolution of the device 54 is predetermined. During the pulling in operation, the yokes holding the cable reels can be revolved to rotate the conductors one turn for every complete revolution of the device 54. By observing the revolutions made by idler pulley 30, or other suitable means for determining the length of cable withdrawn from the reels, the operator is constantly informed of the number of revolutions made by the device 54.

It will be appreciated that because the device 54 rotates as it advances through the pipe line, the three conductors attached thereto will be guided in a helical path and become twisted or spiralled together, as distinguished from the uncontrolled random disposition of the conductors in the pipe line resulting from the conventional methods heretofore employed.

It will be appreciated that in the pulling-in operation, damage to the pulling rope 36 is prevented because of the provision of the swivel 38 between the rear or trailing end of this rope and the guiding, twisting or spiralling device 54.

It will be appreciated also that in the pulling-in operation the teeth on the faces of the bushing 52 and nut 48 of the torque release device 40 will engage as soon as tension is applied. At the end of the pull, just as the device 54 is about to emerge from the pipe line, the pulling winch is stopped and the pulling rope slacked off, and the teeth of the bushing and nut of the torque release device are disengaged allowing the conductor ends to turn sufficiently to release any residual spring action of the conductors. Tension can then be reapplied and the guiding, spiralling, or twisting device pulled completely out of the pipe line. As this device leaves the pipe end, the ends of the cable conductors emerge.

The method of installation above described will result in spiralling together of the conductors throughout their length, giving a lay to the conductors similar in type to that which would be obtained had the single conductors been spiralled together at the factory on a "planetary" type cabling machine. The advantage of this "planetary" type spiral produced by use of the reel mounting equipment shown in Fig. 1, is that the yokes holding the reels are so far as practicable rotated one revolution for each revolution made by the guiding, twisting or spiralling device 54, and both rotations are in the same direction. Therefore, as above explained the residual twisting of individual conductors relative to the individual conductor longitudinal central axis is negligible as both ends of each individual conductor make approxmately the same number of revolutions and in the same direction.

If it is acceptable to simply twist the cables together, then the mounting device shown in Fig. 1 can be omitted and the reels merely supported on a shaft so that the reels are free to rotate as the cables are unwound from them. Otherwise, the installation procedure would be essentially the same as described in detail above. In this type of installation the cables at their trailing ends are restrained by the reels against rotation on the individual axis of each cable while the leading ends are moving in a helical path, which will result in twisting together of the conductors throughout their length, giving a lay to the conductors similar in type to that which would be obtained had the single conductors been twisted together at the factory on a "fixed bobbin" type cabling machine. With this "fixed bobbin" type cabling operation, the individual conductors will be physically deformed in that the individual conductor will be individually twisted on its own longitudinal central axis one revolution for each revolution made by the device 54 as said device is pulled through the pipe. Such deformation is acceptable in the cabling operation of many types of cables.

I do not profess to completely understand all the theory of just why the twist or spiral begins at or near the idler pulley 30 and is satisfactorily uniform throughout the cable length, but experiments I have conducted on miniature model installations have convinced me that satisfactory twists or spirals can be obtained with cable sizes and lengths of even the largest and longest in present day normal commercial practice.

Installation data indicates that the tension on the conductors during the pulling-in operation varies from a comparatively small force at the reel end of the pipe to a relatively large force at the winch end of the pipe. When the group of conductor ends is rotated by the device 54 as it progresses through the pipe, the individual cables are formed into long helixes. These helixes tend to lengthen as tension is increased, this tendency being proportional to the tension on the particular increment of cable considered. However, as the group of cables are in contact with each other all along their length, the helixes cannot lengthen except by rotation of the group in such manner as to unwind the helixes. However, the leading end cannot be rotated by this tension as the leading end of the cable group is fixed onto the guiding or twisting device 54 which in turn is held by penetration or friction of the cutter wheels 112 into or against the pipe walls. Therefore, this tendency of the cable group to unwind at points of highest tension is relieved by action of the cable group in winding together at points of lower tension. The net effect of this phenomenon is that as the cables are drawn into the pipe with the leading end of the group of cables being rotated while in motion longitudinally of the pipe, the conductors twist or spiral together immediately after leaving the idler pulley with a length of lay which is maintained satisfactorily uniform throughout the cable length.

Credence is given to the above theory when it is considered that with certain types of many power transmission conductors presently being installed by conventional practice in large sizes and long lengths, there is a definite tendency to rotation of the group of cables at the winch end where tension is high during installation. Of course, different sizes and constructions of cable exhibit this tendency in different degrees. Also, the pulling rope has an effect if it is connected to the cable group without an intervening swivel. The effect of the pulling rope may be additive or subtractive on the rotation of cables. Always the rotation is in such direction as to unwind the most influential component of the particular cable, such as the individual strands in compact round conductors, or individual segments in segmental conductors or the armor of single layer wire armored cable, assuming that the effect of the pulling rope is small with respect to that of the cable if the pulling rope effect is subtractive to that of the cable.

The commercial types of single conductor cables which when installed in accordance with conventional practice exhibit this tendency to a marked degree are: (1) compact round conductors, having all strands spiralled in the same direction; (2) segmental conductors having all strands spiralled in the same direction and the segments laid up in the same hand as the strands; (3) single layer wire armored cables where tension is placed on the armor. In a standard stranded conductor, alternate layers of strands are spiralled in opposite directions, and the tendency of each layer to untwist when subjected to tension is offset by that of the adjacent layer, so the resultant tendency of the cable group composed of such cables to spiral under tension is very small.

It should be noted that when this rotation occurs near the winch end of the cables in conventional practice, the individual cables are unwound or deformed on their own axis one revolution for every revolution occurring in the cable group. This action actually makes the insulated cables increase in length, and results in the rotated group of conductors being longer than the group would be had the same tension been applied with the individual conductors restrained from rotating and the conductor group restrained from rotating so that the conductors would lie parallel. This lengthening or deformation of the individual stranded cables may cause some damage to the insulation of impregnated paper insulated cables. This deformation is the same type of deformation that will occur throughout the cable length with the "fixed bobbin" type of cabling operation accomplished during installation using my invention as explained above, if the rotation is in a direction to unwind the individual strands. However, with my invention the rotation can be in either direction desired. However, it should be noted that the "planetary" type of cabling operation accomplished during installation using my invention as explained above, will eliminate this type of deformation as well as give a satisfactory spiralled cable throughout the pipe length. This "planetary" type cabling can be in either direction desired.

The most satisfactory lay of the conductors appears to be obtained with "planetary" type cabling in the hand opposite from that of the hand of the individual conductor strands. The resulting tendency of the cable group to untwist under tension, due to the effect of tension tending to lengthen the cable group by uncoiling the helixes formed by the insulated conductors, is in opposition to the tendency of the individual strands to untwist due to tension. The preferable length of lay is such that these two opposing rotational forces balance each other, and there is little or no tendency for the cable group to twist tighter or to untwist when the tension is varied over a considerable range. This length of lay, of course, will vary with different cable constructions and can be determined by tension tests on relatively short cable samples prior to installation. The cutter wheels 112 can then be set at the proper angle to give this length of lay. This type cabling operation will require far less torque to be developed by the device 54 than other types of cabling and will cause an insignificant amount of deformation to the cables during installation, in fact, far less deformation than occurs in present practice.

Figure 8:
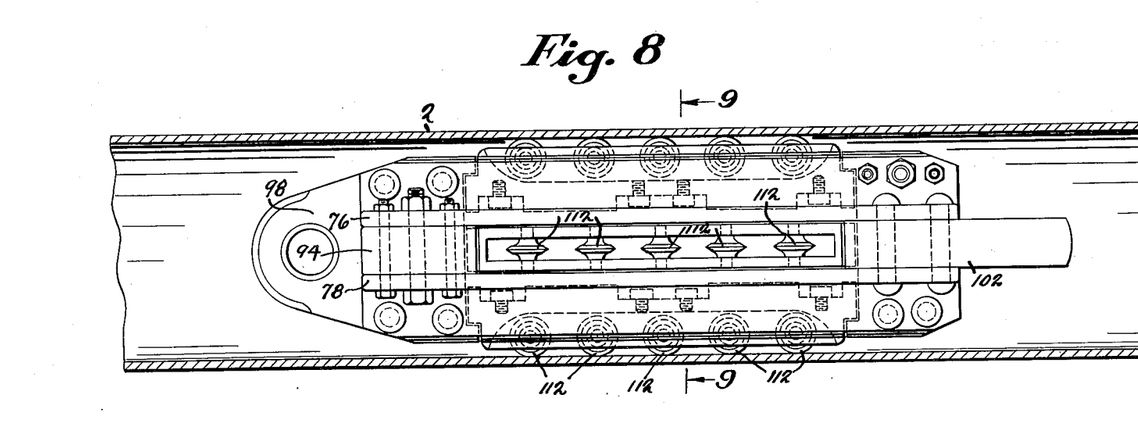
Fig. 8 is a view similar to Fig. 6 of another type of conductor guiding device.
Figure 9:
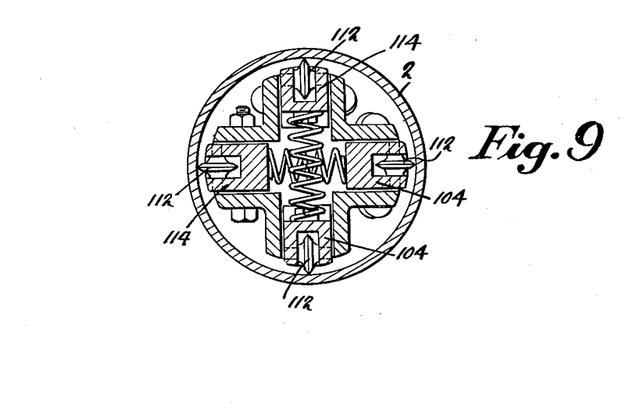
Fig. 9 is a section substantially on the line 9—9 of Fig. 8.

By another adaptation of my invention, the single conductor cables can be made to lay straight in the pipe without appreciable twisting together of the cable group at the winch end, regardless of type of cable construction. In this case, the cutter wheels 112 of device 54 are set straight with the axis of the pipe as shown in Figs. 8 and 9, and the device therefore follows a relatively straight path in being drawn through the pipe and prevents rotation of the cable group connected to the device. This adaptation prevents the deformation of individual conductors at the winch end. With this adaptation, the swivel 38 and/or torque release device 40 can be eliminated if desired, using only the device 54 connected between the pulling rope and pulling eyes on the cable ends.

There is a tendency in the electric power industry to install longer and longer lengths of power cables in order to reduce the number of joints and manholes, and thereby effect considerable construction economy. This trend is occurring with both single and multi-conductor conventional cables installed in ducts. As pulling lengths are increased, the pulling tensions go up. As the pulling tensions go up, the tendency of the cables to untwist during installation increases. In some instances of multi-conductor lead covered cables, this tendency to untwist can become so great that it overcomes the ability of the cable to withstand this tendency and untwisting does occur near the winch end, causing rupture of the lead sheath. This condition can be overcome by using the device 54 connected between the pulling rope and cable ends, the cutter wheels 112 being set straight with the longitudinal axis of the duct, as illustrated in Figs. 8 and 9.

The basic feature of my invention is the insertion of a device between the pulling rope and cables, said device having means to contact by penetration or friction the interior surface of the raceway into which the cable are drawn so as to control the position of the cable ends throughout the drawing-in operation. By such control together with the interaction of tension and other forces mentioned above, the relative position of conductors with respect to each other can be controlled throughout their length, so that a plurality of cable conductors may be twisted together as they are being drawn in, as in the embodiment of my invention illustrated in Figs. 1 to 7, inclusive; or a plurality of conductors may be drawn in so as to be parallel to the raceway by the use of the device illustrated in Figs. 8 and 9; or the conductors may be twisted together before being drawn in and the device 54 of Figs. 8 and 9 employed for controlling the conductors during the drawing-in operation to prevent untwisting of the conductors in this operation.

Of course, the type of cutter wheels used will depend to some extent upon the material of which the raceway is constructed. With some types of raceway, it may be desirable to use wheels with flat faces on the circumference, or oval faces on the circumference, and depend on friction alone between the wheels and raceway walls, rather than wheels with sharp edges on the circumference which do penetrate into the raceway wall. Also, with abrasive raceways, such as cement asbestos duct or tile duct, it may be preferable to use some form of high friction material for the wheels such as hard rubber.

When it is desired to follow a straight path throughout the raceway rather than a circular path, modifications can be made in the device 54 to adapt it to a square or rectangular raceway.

It is to be understood that the details of construction and arrangement of parts hereinabove described and illustrated in the accompanying drawings may be varied within the purview of my invention.

What I claim is:

1. The method of installing a plurality of cable conductors in a raceway, which method comprises continuously twisting the conductors together as they are being drawn from their respective reels and into the raceway, and simultaneously rotating each conductor on its own axis in the same hand as the said conductor twist.

2. The method of installing a plurality of cable conductors in a raceway which method comprises continuously guiding the leading ends of the conductors in helical paths while drawing them into the raceway, simultaneously rotating the supply reel for each conductor in the same hand as said helical paths, thereby to rotate each conductor on its own axis, each conductor making approximately one turn on its own axis for each helical turn taken by the conductors in the raceway.

3. The method of installing a plurality of cable conductors in a raceway which method comprises continuously guiding the leading end of the conductors in helical paths while drawing them into the raceway, and simultaneously rotating each conductor at its trailing end on its own axis in the same hand as the helical paths being taken by the leading ends of the conductors, each conductor making approximately one turn on its own axis for each helical turn taken by the conductors in the raceway.

4. In apparatus for installing a plurality of conductors simultaneously in a raceway, the combination of a pulling rope, a device connected to the pulling rope and to the leading end of the conductors, and rollers carried by said device and disposed about the periphery thereof, some of said rollers constantly engaging the interior of the raceway, the rollers being set at an angle to the longitudinal axis of the raceway and engaging the raceway with such pressure that as the conductors are being drawn into the raceway the device and the leading end of the conductor group will rotate thereby to twist the conductors together.

5. In apparatus for installing a plurality of conductors simultaneously in a raceway, the combination of a pulling rope, a device non-rotatably connected at one end to the leading end of the cable conductors, a swivel connection between the opposite end of the said device and the pulling rope and elements affixed to the device and disposed about its periphery, some of said elements being in constant engagement with the interior of the raceway throughout the pulling in of the conductors, said elements being rotatable about axes diagonal to the longitudinal axis of the raceway the device and the leading end of the conductor group are caused to rotate as the conductors are being drawn in thereby to twist the conductors together.

6. In apparatus for drawing a plurality of conductors simultaneously into a raceway, the combination of a pulling rope, a conductor-guiding and twisting device, a swivel for attaching one end of said device to the pulling rope, a torque-release device for attaching the other end of said device to the conductors and comprising cooperable members, one of which is attached to the leading end of the conductors and the other to the conductor guiding device and adapted to be drawn into non-rotating engagement when tension is applied to the pulling rope in a direction to draw the conductors into the raceway, and rotatable elements affixed to and disposed about the periphery of the conductor-guiding device and held in engagement with the interior of the raceway, said elements being set obliquely with respect to the longitudinal axis of the raceway and engaging the raceway with such pressure that when tension is applied to the pulling rope to draw the conductor-guiding device and the conductors through the raceway the conductor-guiding device will be rotated to twist the conductors together with a controlled lay.

7. In apparatus for drawing a plurality of conductors simultaneously into a raceway, the combination of a pulling rope, a conductor-guiding and twisting device, a swivel connection between one end of said device and the trailing end of the pulling rope, a torque-release device for attaching the other end of said device to the conductors, the torque-release device comprising two cooperating members one of which is attached to said device and the other to the leading end of the conductors and arranged to be drawn into non-rotating engagement with each other when tension is applied to the pulling rope in a direction to draw the conductors into the raceway, and rotatable elements carried on the periphery of the conductor-guiding device, said rotatable elements being disposed obliquely to the longitudinal axis of the raceway, and means for maintaining the rotatable elements in contact with the interior of the raceway with sufficient pressure to cause the conductor-guiding device and the leading end of the conductor group to rotate as the conductors are being drawn in by the pulling rope to twist the conductors together with a controlled lay.

8. In apparatus for installing a plurality of conductors simultaneously in a raceway, the combination of a supply reel for each conductor, means for tumbling said reels to rotate each conductor on the axis of the conductor, a torque-release device comprising two cooperable members, one of which is attached to the leadings ends of the conductors, a conductor guiding and twisting device attached at one end to the other member of the said torque-release device, a swivel connection between the end of the conductor-guiding device opposite the torque release device and the trailing end of the pulling rope, and elements carried on the periphery of the conductor-guiding device, said elements being set obliquely relatively to the longitudinal axis of the raceway and held in constant engagement with the interior of the raceway, whereby when sufficient tension is applied to the pulling rope to draw the conductors into the raceway the two members of the torque release device will be drawn into non-rotating engagement and the conductor-guiding device will be rotated to twist the conductors together with a controlled lay.

9. The method of installing a plurality of electric cable conductors in a raceway, said method comprising drawing the conductors simultaneously into a raceway while restraining the trailing end of the individual conductors against rotation on the axis of the individual conductors, and simultaneously controlling the angular position of the leading end of the individual conductors relatively to the raceway cross-section.

10. The method of installing a plurality of stranded electric cable conductors in a raceway, said method comprising drawing the conductors simultaneously into a raceway, throughout the drawing-in operation while restraining the trailing end of the individual conductors against rotation on the axis of the individual conductors, and throughout the drawing-in operation controlling the leading end of the conductors to prevent rotation of the group due to the longitudinal tension imposed upon the conductors to draw them into the raceway.

11. The method of installing a pretwisted multi-conductor electric cable in a raceway, said method comprising drawing the conductor assembly into a raceway, restraining the trailing end of the conductor assembly against rotation about the longitudinal axis of the conductor assembly, and controlling the angular relation of the leading end of the conductor assembly to the raceway cross-section throughout the drawing-in operation, to retain the assembly substantially in its initial pretwisted condition.

12. The method of installing a plurality of cable conductors in a raceway, which method comprises drawing the conductors simultaneously into a raceway, restraining the trailing end of the individual conductors against rotation on the axis of the individual conductors, and moving the leading ends of the conductors as a unit in helical paths throughout the drawing-in operation, continuously to twist the conductors together as they are being drawn into the raceway.

13. The method of installing a plurality of stranded single conductor cables in a raceway, which method comprises drawing the conductors simultaneously into a raceway, restraining the trailing end of the individual conductors against rotation on the axis of the individual conductors, and continuously rotating the leading end of the conductor group as a unit throughout the drawing-in operation, continuously to twist the conductors together as they are being drawn into the raceway.

14. In apparatus for installing a plurality of cable conductors simultaneously in a raceway, the combination of a pulling rope passing through the raceway, a device within the raceway connected at one end to the trailing end of the pulling rope and at its other end to the leading end of said conductors, means for applying sufficient tension to the said pulling rope to draw the conductors simultaneously into the raceway, and means for effecting contact of said device with the interior surface of said raceway with sufficient pressure continuously to control the angular position of the leading end of the cable conductors with respect to the raceway cross-section throughout the operation of drawing the conductors into the raceway.

15. In apparatus for installing a plurality of electric cable conductors simultaneously in a raceway, the combination of a pulling rope passing through the raceway, a device within the raceway connected at one end to the trailing end of the pulling rope and at its other end to the leading end of said conductors, means for applying sufficient tension to the said pulling rope to draw the conductors simultaneously into the raceway, means at the periphery of said device for contacting the interior surface of the raceway throughout the drawing of the conductors into the raceway, and means for yieldingly holding said contacting means in engagement with the interior surface of the raceway with such pressure as continuously to control the angular position of the cable conductors with respect to the raceway cross-section throughout the operation of drawing the conductors into the raceway.

16. In apparatus for installing a plurality of electric cable conductors simultaneously in a raceway, the combination of a pulling rope passing through the raceway, a device within the raceway connected at one end to the trailing end of the pulling rope and at its other end to the leading end of said conductors, means for applying sufficient tension to the said pulling rope to draw the conductors simultaneously into the raceway, guiding means carried at the periphery of said device and engaging the interior surface of the raceway to effect rotation of the device as the device is drawn through the raceway, continuously to guide the leading end of the conductors in a rotative path as the conductors are being drawn into the raceway.

RHEA P. LAPSLEY.

REFERENCES CITED

The following references are of record in the file of this patent:

UNITED STATES PATENTS

| Number | Name | Date |
| --- | --- | --- |
| 400,958 | Seely | Apr. 9, 1889 |
| 525,192 | Duffy | Aug. 28, 1894 |
| 614,597 | Wrigley | Nov. 22, 1898 |
| 1,177,984 | Beene | Apr. 4, 1916 |
| 1,732,410 | Martin | Oct. 22, 1929 |
| 1,933,624 | Guthrie | Nov. 7, 1933 |